US009418516B2

(12) United States Patent
Weiss et al.

(10) Patent No.: US 9,418,516 B2
(45) Date of Patent: Aug. 16, 2016

(54) LOSS-REDUCTION INSURANCE IN ELECTRONIC GAMING

(71) Applicant: AGS, LLC, Las Vegas, NV (US)

(72) Inventors: Steven Weiss, Henderson, NV (US); Brooke Dunn, Henderson, NV (US)

(73) Assignee: AGS, LLC, Las Vegas, NV (US)

( * ) Notice: Subject to any disclaimer, the term of this patent is extended or adjusted under 35 U.S.C. 154(b) by 286 days.

(21) Appl. No.: 14/027,794

(22) Filed: Sep. 16, 2013

(65) Prior Publication Data

US 2015/0080086 A1 Mar. 19, 2015

(51) Int. Cl.
*G06F 17/00* (2006.01)
*G07F 17/32* (2006.01)

(52) U.S. Cl.
CPC .................................. *G07F 17/3265* (2013.01)

(58) Field of Classification Search
USPC ..................................................... 463/16–31
See application file for complete search history.

(56) References Cited

U.S. PATENT DOCUMENTS 7,771,273 B2 8/2010 Walker et al.
8,282,489 B2 10/2012 Arezina et al.
8,287,347 B2 10/2012 Snow et al.
8,485,906 B2 7/2013 Walker et al.
8,500,562 B2 8/2013 Walker et al.
8,517,820 B2 * 8/2013 Schwartz ................ G07F 17/32 463/16
2008/0058052 A1 * 3/2008 Schwartz ................ G07F 17/32 463/16
2008/0058054 A1 * 3/2008 Schwartz ................ G07F 17/32 463/16
2008/0058092 A1 3/2008 Schwartz et al.
2015/0224387 A1 * 8/2015 Lee ........................... A63F 1/00 273/292

* cited by examiner

*Primary Examiner* — Ronald Laneau
(74) *Attorney, Agent, or Firm* — Weide & Miller, Ltd.

(57) ABSTRACT

An apparatus enables play of a wagering game in which winning outcomes are determined by random appearance of specific predetermined symbols in which:

a player places a wager worth monetary value on a single gaming event in the wagering game;

the player purchases with monetary value a safeguard action useful only in the single gaming event;

the player receives a first complete set of symbols;

if one symbol in the first complete set of symbols prevents or limits an amount of award in the single gaming event, the player exercises the safeguard action to discard the one symbol and have that one symbol replaced with one randomly provided symbol to form a second complete set of symbols; and the wager is resolved against a paytable using the second set of complete symbols.

19 Claims, 12 Drawing Sheets

FIG. 5

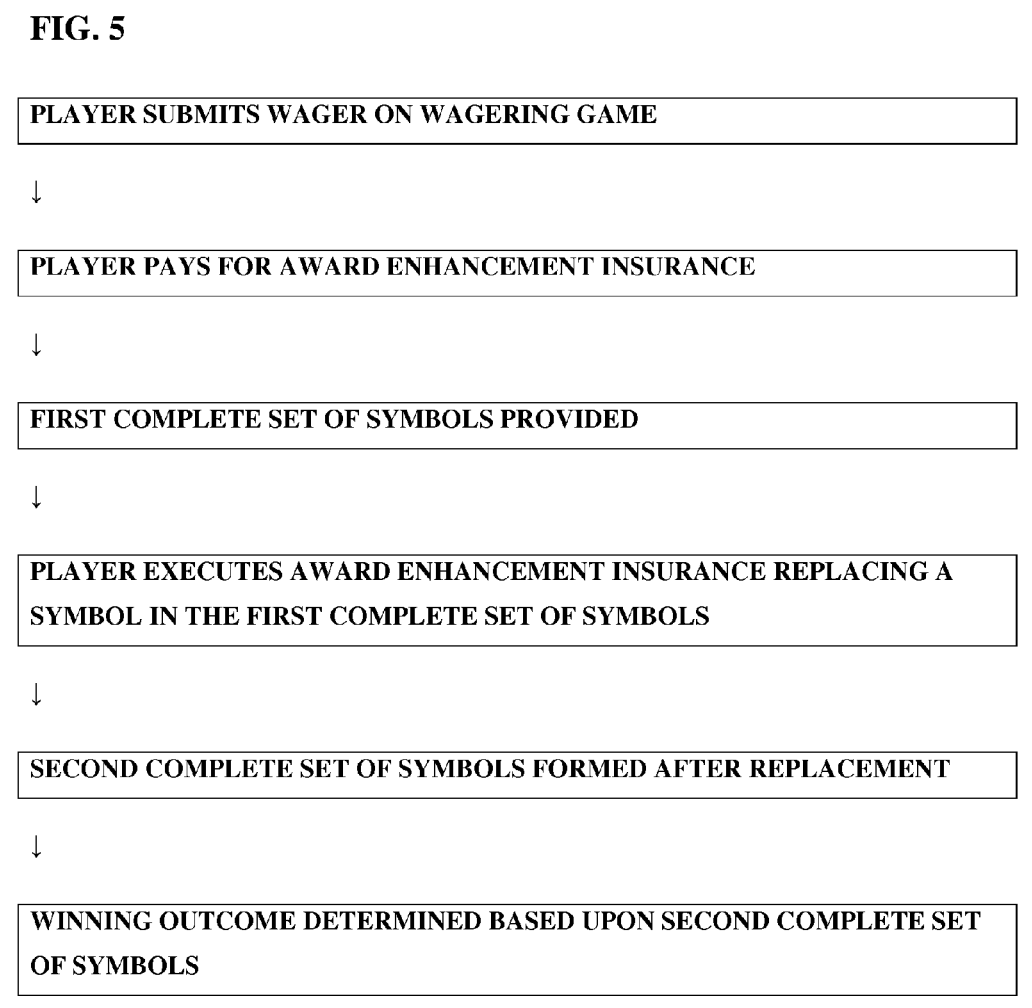

PLAYER SUBMITS WAGER ON WAGERING GAME

↓

PLAYER PAYS FOR AWARD ENHANCEMENT INSURANCE

↓

FIRST COMPLETE SET OF SYMBOLS PROVIDED

↓

PLAYER EXECUTES AWARD ENHANCEMENT INSURANCE REPLACING A SYMBOL IN THE FIRST COMPLETE SET OF SYMBOLS

↓

SECOND COMPLETE SET OF SYMBOLS FORMED AFTER REPLACEMENT

↓

WINNING OUTCOME DETERMINED BASED UPON SECOND COMPLETE SET OF SYMBOLS

| | | | | |
|---|---|---|---|---|
| Car | Car | Car | Wreck | Car |

FIG. 8A

| | | | | |
|---|---|---|---|---|
| Car | Car | Car | Car | Car |

FIG. 8B

| | | | | |
|---|---|---|---|---|
| Gold medal | Disqualified | Gold medal | Gold medal | Gold medal |

FIG. 8C

| | | | | |
|---|---|---|---|---|
| Gold medal | Bronze medal | Gold medal | Gold medal | Gold medal |

FIG. 8D

| | | | | |
|---|---|---|---|---|
| Gold medal | Disqualified | Disqualified | Silver medal | Bronze medal |

FIG. 8E

LOSS-REDUCTION INSURANCE IN ELECTRONIC GAMING

BACKGROUND OF THE INVENTION

1. Field of the Invention

The present technology relates to the field of electronic gaming in all of its various formats and to game outcomes determined by accumulation and display of symbols (in order or not) and in which players may increase their chances of winning by purchasing symbol replacement insurance.

2. Background of the Art

In the gaming technology field, there have been few substantive ways in which players can reduce the likelihood of losses and/or increase the probability of a winning outcome without the use of gaming skills. The most traditional non-skill tactics available for giving players an apparent level of control over immediate game outcomes are the two tactics of insurance and surrender in blackjack and the "nudge" in slot machine games.

The insurance wager is available to a player when the dealer's up-card is an Ace, and only an Ace. The player may make an insurance wager that is no greater than (but may be less than) exactly half the player's game wager. If the dealer has a 10-count card in the hole (statistically 30.76% of the time), the insurance wager is paid at 2:1 odds. In the insurance play, when a player believes that he is likely to lose and entire wager on a round of blackjack, the player may "surrender" on the hand, forfeiting half of his wager and withdrawing half the wager. The "nudge" is an event in slot machines where one of the frames can shift its position towards a winning event. A nudge slot machine will move the winning combination up or down that little nudge that it needs.

U.S. Pat. Nos. 7,771,273; 8,485,906 and 8,500,562 disclose a form of long-term gambling insurance. The invention includes a system and method for planning and customizing a gaming vacation. The central controller provides feedback regarding the user's requests. The feedback may include, for example, marketing offers for the user and/or configuring a gaming device according to the configuration data associated with a preparation code received from a user at the gaming device.

U.S. Pat. No. 8,282,489 (Arezina) describes Remove Terminators. The player can acquire a symbol that helps to increase the perception of achieving a favorable outcome. In exchange for one or more points, the player can acquire an insurance symbol that prevents a game terminating outcome. For example, the player may purchase a "Pooper Scooper" symbol that removes a "Pooper" symbol, which functions as a game terminating outcome. The "Pooper Scooper" symbol can be selected from an array of player-selectable elements. A player can purchase an extra "pooper scooper" in exchange for points. Do-Over. One or more points can be exchanged for a second chance, or a do-over, game feature. The player buys the second chance feature that allows the player to continue game-play or to re-play a particular play that has resulted in an unfavorable outcome for the player. For example, if the player is playing a bonus game in which three items of the same kind must be revealed within a limited period of time, the player may want to purchase a second chance feature to extend the period of time. Similarly, if the player is playing a bonus game in which the player must find a hidden treasure, the player may want to purchase a do-over feature if the player has not found the hidden treasure during an initial game session. Non-monetary points are scored in an account and used to purchase gaming play events.

U.S. Pat. No. 8,287,347 (Snow) describes a playing card gaming system that provides the player with an opportunity to withdraw a game play decision that is less advantageous to a player than at least one other play decision. The system includes a player interface that displays a prompt when a less advantageous decision is made. The display may include an area that provides the dealer with a visual indication that the player is being asked to confirm an election. A card delivery system with a playing card information reader provides card information to the system. A game processor determines if player elections are disadvantageous.

Published U.S. Patent Document 20080058092 (Schwartz) describes a multi-opportunity, risk vs. reward, playfield-style gaming platform grants players the ability to evaluate gaming situations and decide whether to risk current assets for greater rewards throughout the course of a game. Players have multiple opportunities to make risk versus reward decisions that ultimately affect the financial outcome of game play. Positive impact squares, negative impact squares and indifferent impact squares are assigned to the game playfield though the software platform based upon manufacturer and casino specified odds for each "Coin-In" credit level and value of game play. A status and information area legend is updated through the software platform and reports important game play information to players, allowing them to make more informed decisions throughout the course of their gaming experience.

All references cited herein are incorporated by reference in their entirety.

SUMMARY OF THE INVENTION

A method and apparatus for providing players with an apparent loss-reduction, win-increasing modality of play is enabled. An apparatus enables play of a wagering game in which winning outcomes are determined by random appearance of specific predetermined symbols in which:

- a player places a wager worth monetary value on a single gaming event in the wagering game;
- the player purchases with monetary value a safeguard action useful only in the single gaming event;
- the player receives a first complete set of symbols;
- if one symbol in the first complete set of symbols prevents or limits an amount of award in the single gaming event, the player exercises the safeguard action to discard the one symbol and have that one symbol replaced with one randomly provided symbol to form a second complete set of symbols; and
- the wager is resolved against a paytable using the second set of complete symbols.

BRIEF DESCRIPTION OF THE FIGURES

FIG. 5 shows a flow diagram for playing a wagering method according to the present invention;

FIG. 8A shows a schematic diagram of a series of game displays useful in the practice and play of the present invention.

FIG. 8B shows another schematic diagram of a series of game displays useful in the practice and play of the present invention.

FIG. 8C shows another schematic diagram of a series of game displays useful in the practice and play of the present invention.

FIG. 8D shows another schematic diagram of a series of game displays useful in the practice and play of the present invention.

FIG. 8E shows another schematic diagram of a series of game displays useful in the practice and play of the present invention.

DETAILED DESCRIPTION OF THE INVENTION

Figure 1:
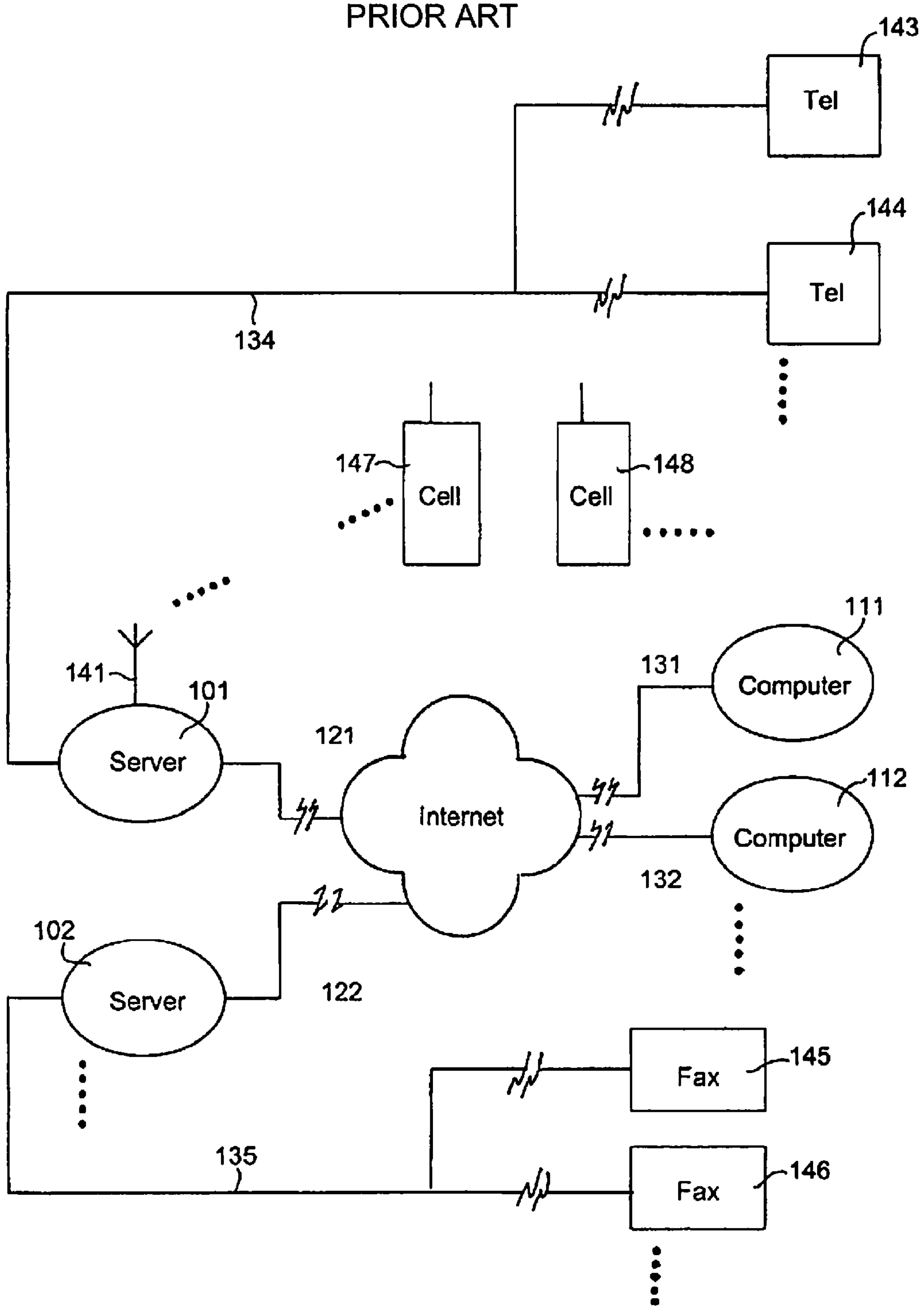
FIG. 1 PRIOR ART
FIG. 1 shows a schematic for a Prior Art internet wagering system that may be used in combination with the present invention.

The present invention includes a range of modalities and apparatus and systems for enabling a method of playing a wagering game in which winning outcomes are determined by random appearance of specific predetermined symbols. The use of symbols to provide outcomes in gaming outcomes is particularly well known in physical slot machine outcomes and in their more modern video slot machine counterparts. The symbols can range from the traditional symbols (e.g., by way of non-limiting examples, 7's, bars, fruit, bells, and the like) to modern thematic symbols, such as characters, vehicles, objects, segments of figures, moving objects, blank spaces, and the like. The symbols are read by a processor or mapping coordinator, and the reading is done according to paylines and numbers of positions of symbols and scatter positions of unique symbols. The symbols usually must be related, similar or the same in the payline to create a winning outcome, except in the situation of scatter pays.

It has always been both a frustrating and tantalizing outcome where a symbols display is "close" to a significant winning event. In five-card draw poker, it is a rule of the game that one to five playing cards may be discarded and replaced without paying an additional fee. In certain poker games, a payment can be tendered after receipt of the final hand so that (usually) a single card may be replaced one time in a stud game. It is an aspect of the present technology that an event outcome adjustment payment (like an insurance activity) can be made either before or after the first display of a complete set of symbols. It is also an optional event play sequence where the option may be available for use only before a first complete set of symbols is provided. This can be used to adjust the hold in the play of the game. For example, in a five-symbol payline, the rules of the game may allow for or require the event adjustment event (EAE) to be exercised after the first symbol is received, or after the second symbol, the third symbol, the fourth symbol or the fifth symbol is received. The point of availability for exercising the EAE can be used to adjust the odds in the paytable. For example, if the EAE is exercised on the second symbol receipt (after all, it has in some events already been paid for, the highest or a higher paytable may be maintained with an early exercise of the EAE), paytables may be adjusted to balance out the fact that a five-symbol event has been changed to a best-of-six five-symbol event. For example, if the EAE is exercised after two symbols are received, the maximum paytable may be in effect. The paytable may be altered to intermediate payout odds if the EAE is exercised after three or after four symbols are received. The paytable may be further altered to a lowest payout rate if the EAE is or must be exercised only after all five symbols are received. A single paytable may be used for all times of EAE exercise, which strategically would suggest waiting until all symbols have been received.

A method may include a player placing a wager worth monetary value on a single gaming event in the wagering game. By "single gaming event" is meant a gaming event with a specific beginning and a limited number of steps that can occur in the gaming event. In this case, there is a wager, an optional or required insurance-like wager (the EAE), provision of the first complete set of symbols, exercising or not of the EAE event, and upon completion of the second complete set of symbols, and resolution of the wager. There might be some intermediate events, but there should not be any substantive steps or events after the completion of the second complete set of symbols and/or the resolution. The player purchases with monetary value a safeguard action (EAE) useful only in the single gaming event. As noted the purchase should be made before all symbols are received, but may be purchased before any symbol is received or after 1, 2, 3, 4 or 5 (assuming five is the total in a payout line). In a multi-column, multi-row format (e.g., 3 rows by 5 columns; 5 rows by 5 columns; 5 rows by 3 columns, etc.) the EAE may provide only a single frame/symbol replacement on the first complete set of symbols or may have multiple replacements, but never more than one symbol per payline.

The player has then received a first complete set of symbols, of whatever type are being used in the gaming format. If one symbol in the first complete set of symbols prevents or limits an amount of award in the single gaming event, the player exercising the safeguard action to discard the one symbol and have that one symbol replaced with one randomly provided symbol to form a second complete set of symbols. By "limiting" the amount of a reward, one could have four of the same symbols in a payline which pays out (by way of a non-limiting example) 2× or 10× the Ante wager, while five of those same symbols would pay 50× the Ante wager. By "preventing" is meant that even with a significant number of quality symbols, there is no payout because of the adverse symbol (e.g., four cherries or four bars, and a crow symbol or rust symbol, respectively), there is no payout. When the preventing symbol is replaced, there is a very high likelihood of an award (unless another prevent symbol is randomly provided). It is for this reason that when a prevent symbol is removed by the EAE exercise, the paytable may or should decrease. The player would still be satisfied by getting any payout where he was denied before.

The first complete game event would conclude by resolving the wager against a paytable using the second set of complete symbols. In a less preferred embodiment, the symbols are provided by physical playing cards provided by a live dealer. The cards may have non-traditional symbols thereon or have standard playing card symbols (Ace through King, with spades, hearts, diamonds and clubs). In another embodiment, the symbols are provided by virtual playing cards provided by a random number generator associated with a processor and displayed on a video display surface. The preferred method is played on a gaming apparatus that provides symbols randomly in frames distributed in columns and rows and winning outcomes are determined against the paytable according to paylines in the columns and rows. There may be one or more paylines. The method may have the gaming apparatus provide the symbols on mechanical reels in an intermediate preference in game structure. The most preferred method may have the symbols provided as random symbols provided by a random number generator associated with a processor and displayed on a video display surface. The method may or may not have the symbols relate to a theme other than playing cards. In this preferred method, the one symbol is an image that has a negative connotation within the theme, such as an accident/crash versus car symbols, poison ivy versus picnic symbols, a boot versus fish symbols, a storm cloud versus sun symbols, a Klingon versus Star Trek characters, and the like. The safeguard action (e.g., the EAE) is preferably purchased before the first complete set of symbols is provided and the safeguard action should not be usable after conclusion of the single gaming event. Alternatively, the safeguard action is purchased after a portion or all of the first complete set of symbols is provided and the safeguard action is not usable after conclusion of the single gaming event. In these last two events, the paytable may be modified (as described above) to reduce the payout with later EAE replacements. The method of claim 6 wherein the player communicates with the processor through a player input system in communication link with the processor to exercise the safeguard action.

The present invention also relates to gaming apparatus for performance of a wagering game, the apparatus having a processor, player input controls and a display screen, the processor configured to execute code to perform the wagering game in which winning outcomes are determined by random appearance of specific predetermined symbols:

- the processor recognizing a player placing a wager worth monetary value on a single gaming event in the wagering game;
- the processor recognizing a player purchasing with monetary value a safeguard action useful only in the single gaming event;
- the processor executing code to display on the display screen to the player a first complete set of virtual symbols;
- if one virtual symbol in the first complete set of symbols prevents or limits an amount of award in the single gaming event, the player inputs instructions to the processor to exercise the safeguard action to discard the one virtual symbol and have that one virtual symbol replaced with one randomly provided virtual symbol to form a second complete set of virtual symbols; and
- resolving the wager against a paytable using the second set of complete virtual symbols.

As with the descriptions of the method above, the apparatus symbols may be provided by the processor as random symbols provided by a random number generator associated with a processor and displayed on a video display surface. The virtual symbols may or may not relate to a theme other than playing cards. The apparatus may have the one virtual symbol be an image that has a negative connotation within the theme, as described with the method above. The apparatus may enable the safeguard action to be purchased before the first complete set of virtual symbols is provided and the safeguard action is not usable after conclusion of the single gaming event. The apparatus may enable the safeguard action to be purchased before any or all of the virtual symbols in the first complete set of virtual symbols is provided and the safeguard action is not usable after conclusion of the single gaming event.

FIG. 1A shows a two-dimensional representation of a three-dimensional array according to the present invention.

FIG. 1B shows the two-dimensional representation of a three-dimensional array according to the present invention as shown in FIG. 1A with a few selected non-linear paylines shown.

All wager resolutions are made by the processor based upon a look-up table in which both all random event outcome and all random symbol placements are considered in the resolution of each wager.

Figure 2:
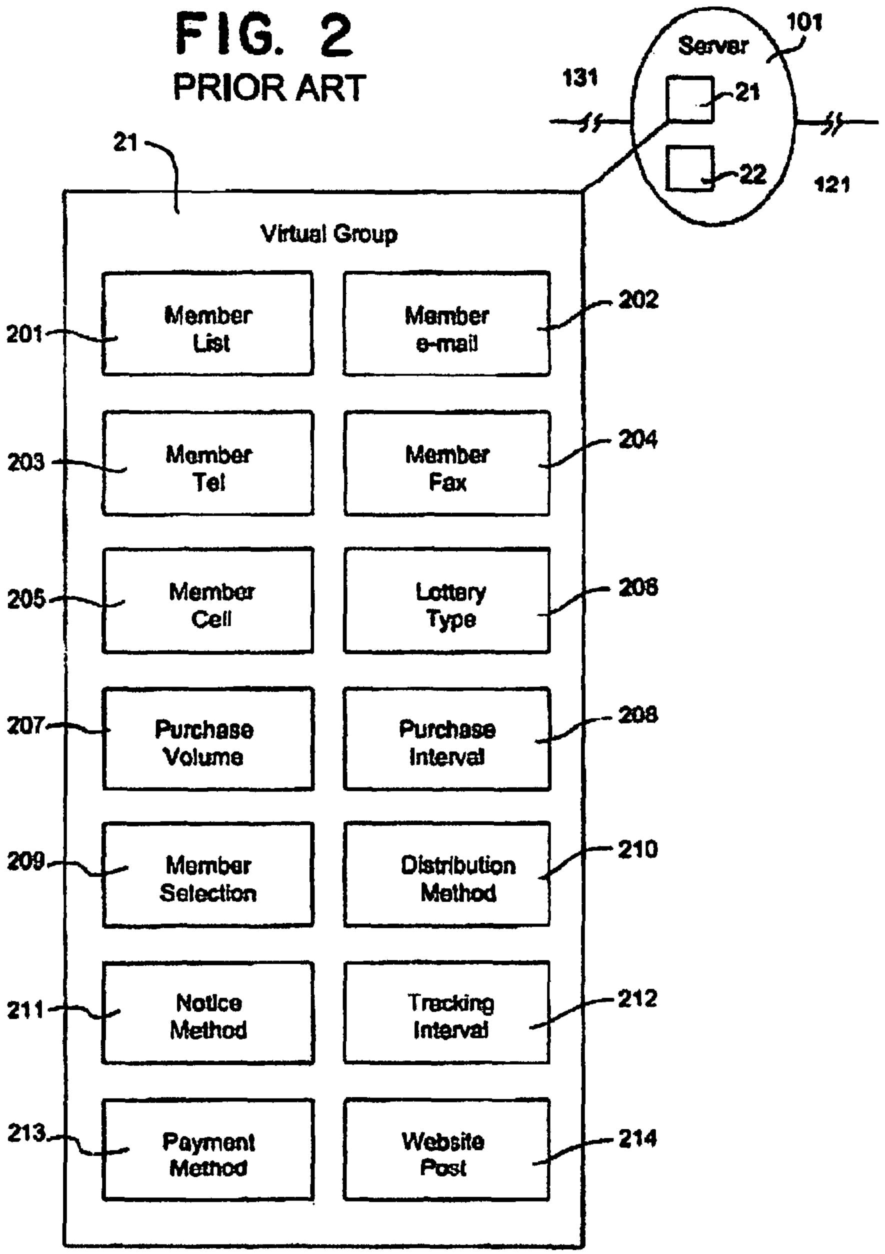
FIG. 2 PRIOR ART
FIG. 2 shows a schematic for a Prior Art internet wagering system that may be used in combination with the present invention.

FIG. 2 shows a top plan view of the same prior art automated gaming system 1 with the viewing screen 7 shown more clearly as a CRT monitor. It can also be seen that each player position has to form an arc cut into the semicircular player seating area 18.

Figure 1C:
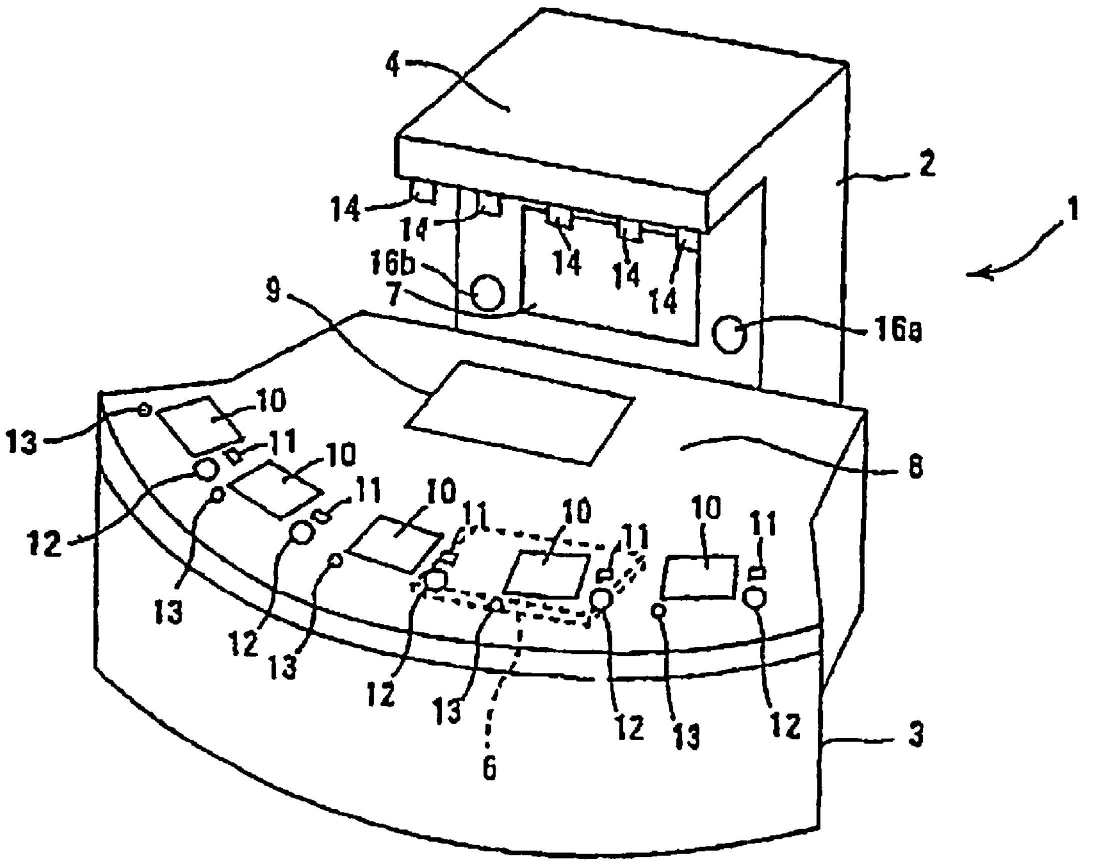
Fig. 1C Prior Art
FIG. 1C shows a perspective view of a prior art format for an automated gaming system.
Figure 3:
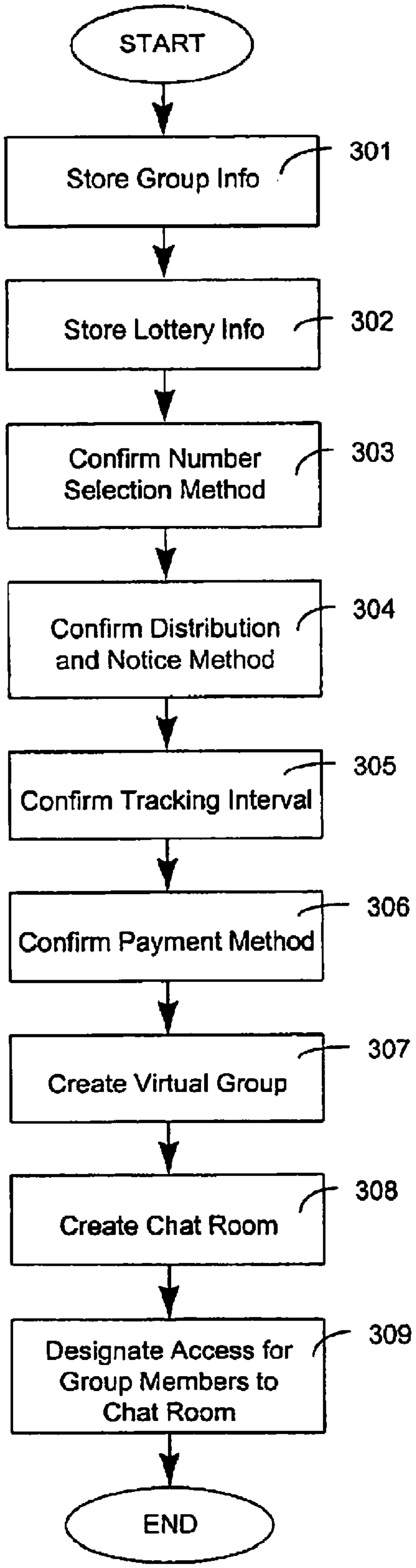
FIG. 3 PRIOR ART
FIG. 3 shows a schematic for a Prior Art internet wagering system that may be used in combination with the present invention
Figure 3A:
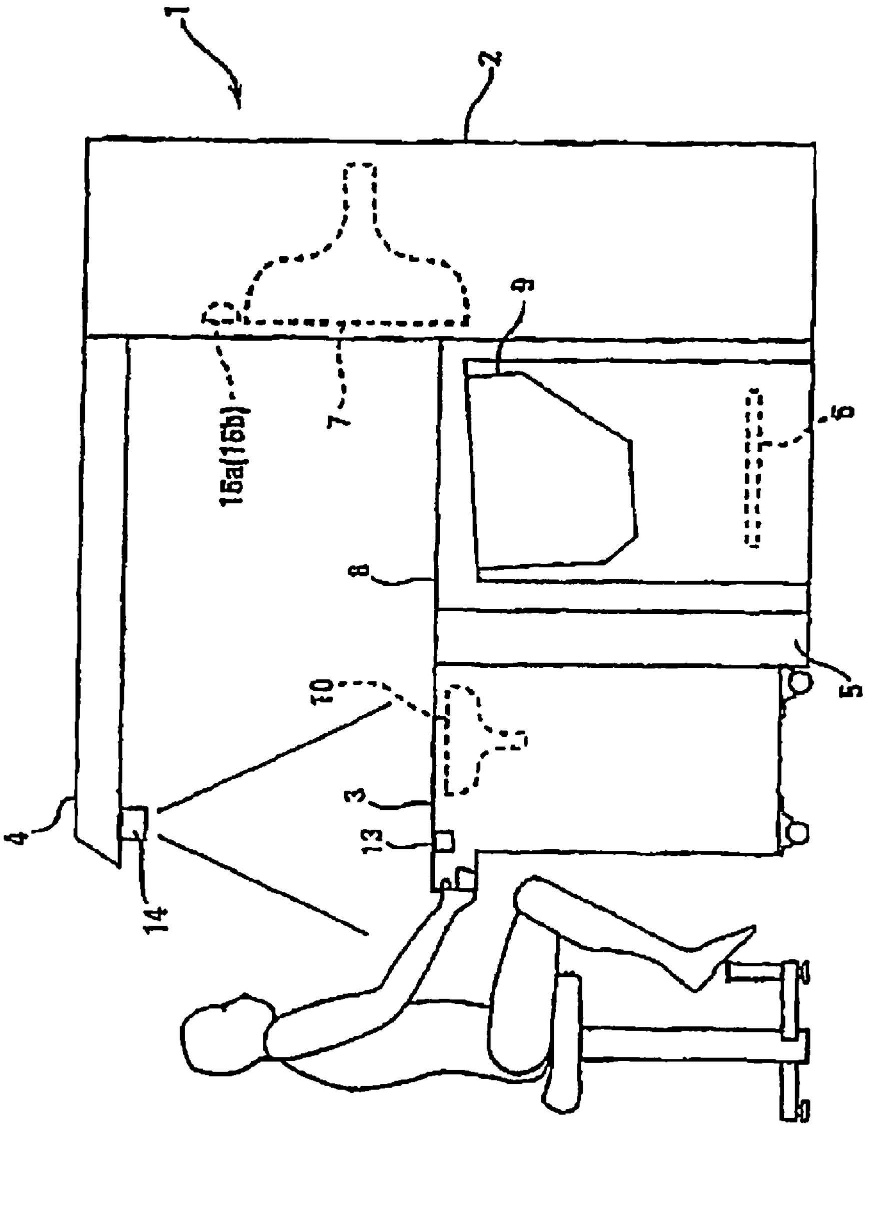
Fig. 3A Prior Art
FIG. 3A shows a side elevational view of a prior art format for an automated gaming system.

FIG. 3 shows a side elevation view of the same prior art automated gaming system of FIGS. 1C and 2 where the orientation of the three different types of CRT monitors 7, 9 and 10 are shown.

Figure 4:
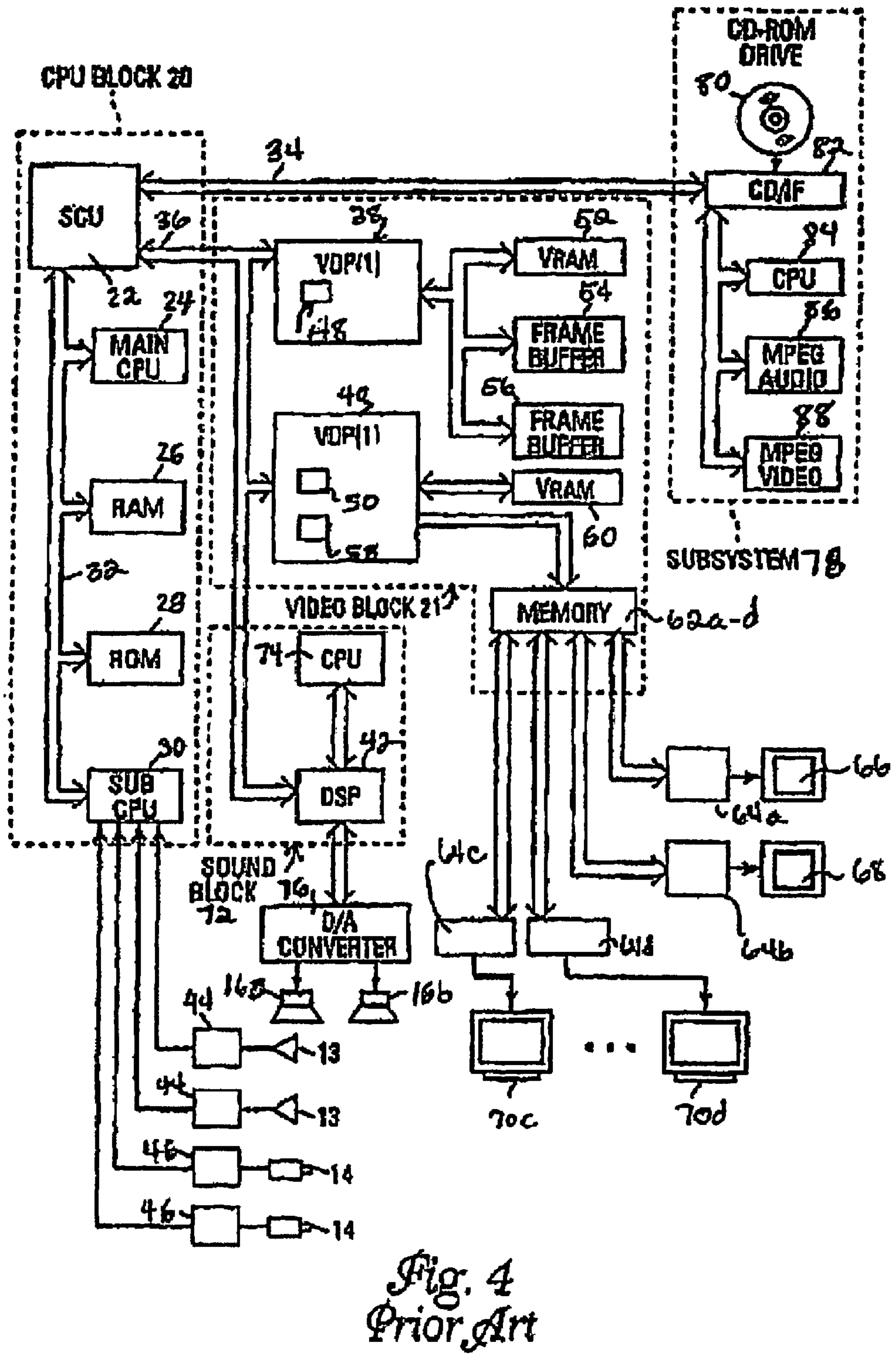
Fig. 4 Prior Art
FIG. 4 shows a block schematic diagram of the electronic configuration of a prior art automated gaming system.
Figure 4A:
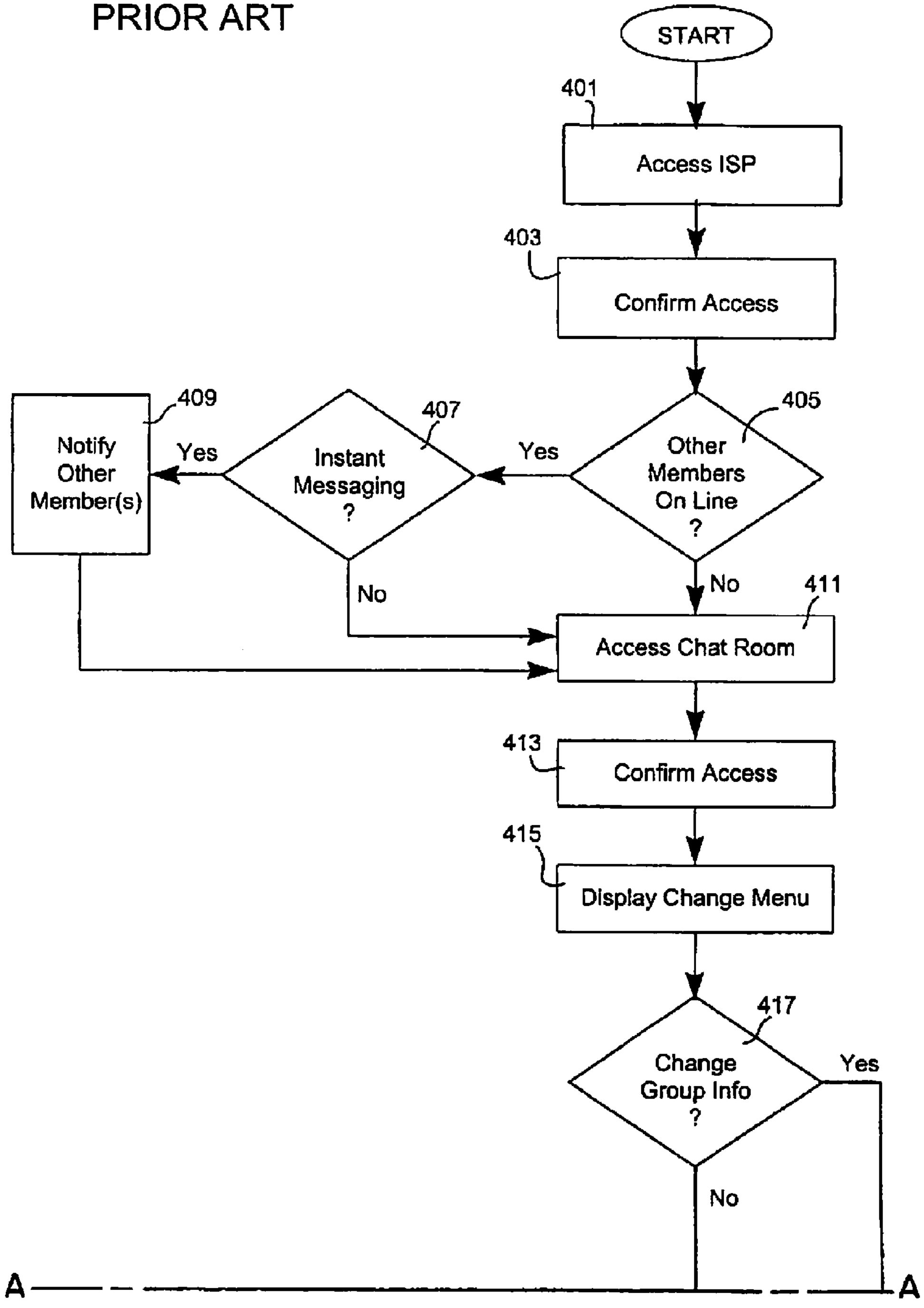
FIG. 4A PRIOR ART
FIG. 4A shows a schematic for a Prior Art internet wagering system that may be used in combination with the present invention.
Figure 4B:
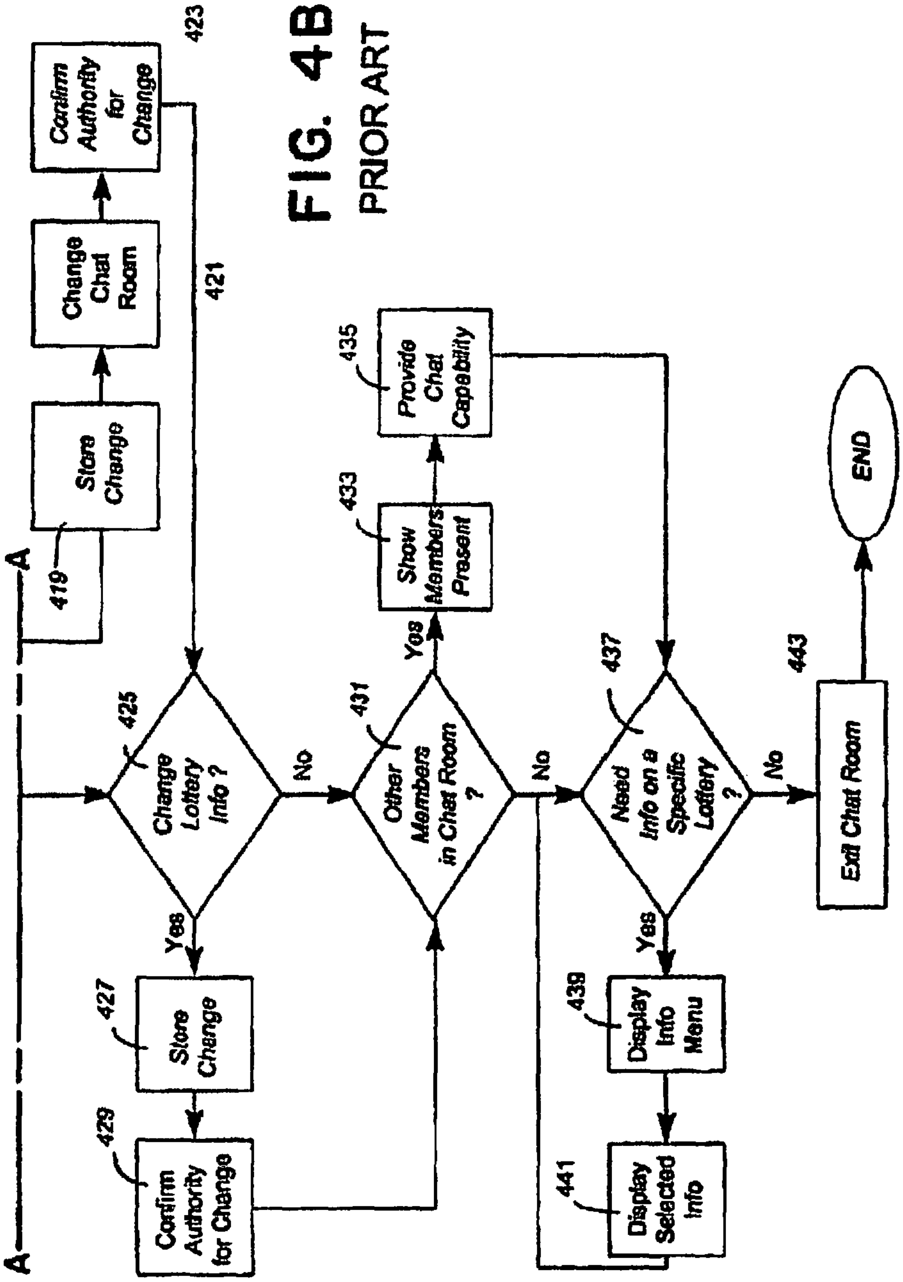
FIG. 4B PRIOR ART
FIG. 4B shows a schematic for a Prior Art internet wagering system that may be used in combination with the present invention.

FIG. 4 shows the schematic circuitry of a prior art automated system as disclosed in U.S. Patent Publication No. 2003/0199316. FIG. 4 is a block diagram of processing circuitry in the game device of FIG. 1C. The game device housing comprises a CPU block 20 for controlling the whole device, a picture block 21 for controlling the game screen display, a sound block for producing effect sounds and the like, and a subsystem for reading out CD-ROM.

The CPU block 20 comprises an SCU (System Control Unit) 22, a main CPU 24, RAM 26, RAM 28, a sub-CPU 30, and a CPU bus 32. The main CPU 24 contains a math function similar to a DSP (Digital Signal Processing) so that application software can be executed rapidly.

The RAM 26 is used as the work area for the main CPU 24. The RAM 28 stores the initialization program used for the initialization process. The SCU 22 controls the busses 32, 34 and 36 so that data can be exchanged smoothly among the VDPs 38 and 40, the DSP 42, and other components.

The SCU 22 contains a DMA controller, allowing data (polygon data) for character(s) in the game to be transferred to the VRAM in the video picture block 21. This allows the game machine or other application software to be executed rapidly. The sub-CPU 30 is termed an SMPC (System Manager & Peripheral Control). Its functions include collecting sound recognition signals from the sound recognition circuit 44 or image recognition signals from the image recognition circuit 46 in response to requests from the main CPU 24. On the basis of sound recognition signals or image recognition signals provided by the sub-CPU 30, the main CPU 24 controls changes in the expression of the character(s) appearing on the game screen, or performs image control pertaining to game development, for example. The picture video block 21 comprises a first VPD (Video Display Processor) 38 for rendering TV game polygon data characters and polygon screens overlaid on the background image, and a second VDP 40 for rendering scrolling background screens, performing image synthesis of polygon image data and scrolling image data based on priority (image priority order), performing clipping, and the like. The first VPD 38 houses a system register 48, and is connected to the VRAM (DRAM) 52 and to two frame buffers 54 and 56. Data for rendering the polygons used to represent TV game characters and the like is sent to the first VPD 38 through the main CPU 24, and the rendering data written to the VRAM 52 is rendered in the form of 16- or 8-bit pixels to the rendering frame buffer 54 (or 56). The data in the rendered frame buffer 54 (or 56) is sent to the second VDP 40 during the display mode. In this way, buffers 54 and 56 are used as frame buffers, providing a double buffer design for switching between rendering and display for each individual frame. Regarding information for controlling rendering, the first VPD 38 controls rendering and display in accordance with the instructions established in the system register 48 of the first VPD 38 by the main CPU 24 via the SCU 22.

The second VDP 40 houses a register 50 and color RAM 58, and is connected to the VRAM 60. The second VDP 40 is connected via the bus 36 to the first VPD 38 and the SCU 22 and is connected to picture output terminals Voa through Vog through memories 62*a-d* and encoders 64*a-d*. The picture output terminals Voa through Vog are connected through cables to the main game displays 66, 68 and the satellite displays 70. Scrolling screen data for the second VDP 40 is defined in the VRAM 60 and the color RAM 58 by the CPU 24 through the SCU 22. Information for controlling image display is similarly defined in the second VDP 40. Data defined in the VRAM 60 is read out in accordance with the contents established in the register 50 by the second VDP 40, and serves as image data for the scrolling screens that portray the background for the character(s). Image data for each scrolling screen and image data of texture-mapped polygon data sent from the first VPD 38 is assigned display priority (priority) in accordance with the settings in the register 48, and the final image screen data is synthesized.

Where the display image data is in palette format, the second VDP 40 reads out the color data defined in the color RAM 58 in accordance with the values thereof, and produces the display color data. Color data is produced for each display 66 and 68 and for each satellite display 70. Where display image data is in RGB format, the display image data is used as-is as display color data. The display color data is temporarily stored in memories 62*a-d* and is then output to the encoders 64*a-d*. The encoders 64*a-d* produce picture signals by adding synchronizing signals to the image data, which is then sent via the picture output terminals Voa through Vog to the display 66, 68 and the satellite displays 70. In this way, the images required to conduct an interactive game are displayed on the screens of the display 66, 68 and the satellite displays 70.

The sound block 72 comprises a DSP 42 for performing sound synthesis using PCM format or FM format, and a CPU 74 for controlling the DSP 42. Sound data generated by the DSP 42 is converted into 2-channel sound signals by a D/A converter 76 and is then presented to audio output terminals Ao via an interface (not shown). These audio output terminals Ao are connected to the input terminals of an audio amplification circuit (not shown). Thus, the sound signals presented to the audio output terminals Ao are input to the audio amplification circuit (not shown). Sound signals amplified by the audio amplification circuit drive the speakers 16*a* and 16*b*.

The subsystem 78 comprises a CD-ROM drive 80, a CD-UF 82, and CPU 84, an MPEG-AUDIO section 86, and an MPEG-PICTURE section 88. The subsystem 78 has the function of reading application software provided in the form of a CD-ROM and reproducing the animation. The CD-ROM drive 80 reads out data from CD-ROM. The CPU 84 controls the CD-ROM drive 80 and performs error correction on the data read out by it. Data read from the CD-ROM is sent via the CD-UF 82, bus 34, and SCU 22 to the main CPU 24 that uses it as the application software. The MPEG-AUDIO section 86 and the MPEG-VIDEO section 88 are used to expand data that has been compressed in MPEG (Motion Picture Expert Group) format. By using the MPEG-AUDIO section 86 and the MPEG-VIDEO section 88 to expand data that has been compressed in MPEG format, it is possible to reproduce motion picture. It should be noted herein that there are distinct processors for the CPU block, video block, sound block, CD-ROM drive and Memory with their independent CPU's. This requires significant computing power and still has dumb (no intelligence) player input components.

FIG. 5 shows a flow chart of one method of electronic play of a game of the present invention.

Figure 6:
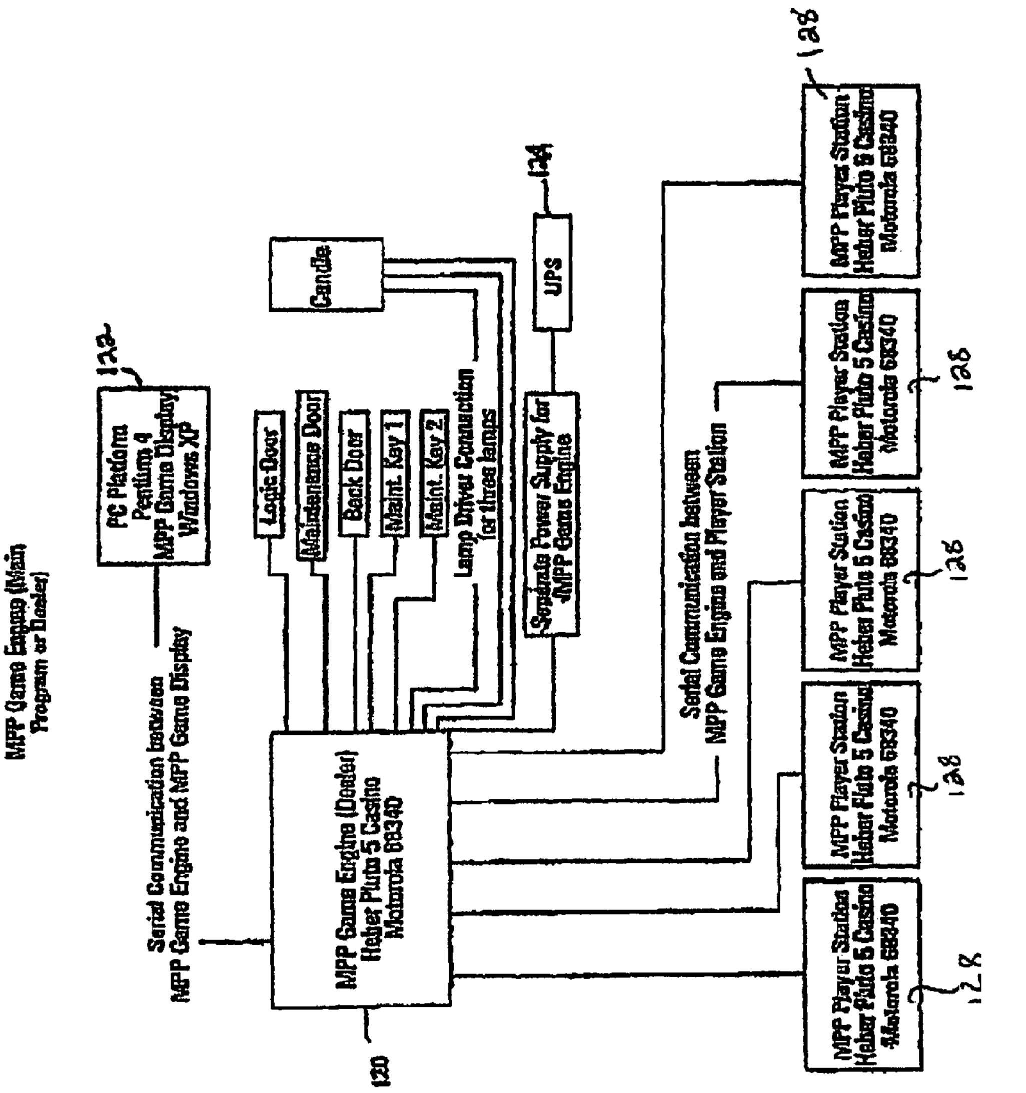
PRIOR ART Fig. 6
FIG. 6 shows a schematic diagram of a gaming engine useful in the practice of the present invention.

FIG. 6 shows an electronic/processor schematic for a MultiPlayer Platform (MPP) gaming system according to the presently described invention. The MPP Game engine (dealer) comprises a Heber Pluto 5 casino game board 120 (Motorola 68340 board) operating off the PC Platform Pentium® 4 MPP Game Display processor 122. The game display processor operates on a Windows XP platform. The respective subcomponents on the Pentium 4 processor are labeled to show the apportionment of activity on the motherboard and the component parts added to the board. As is shown, the game engine has an Uninterruptible Power Supply 124. The game display processor directs activity on the Speakers, directs activities onto the MPP Game Service panel, and the Plasma Monitor Card Table display. It is important to note that all communications are direct from the game display processor, freeing up resources available to the game engine processor.

Figure 7:
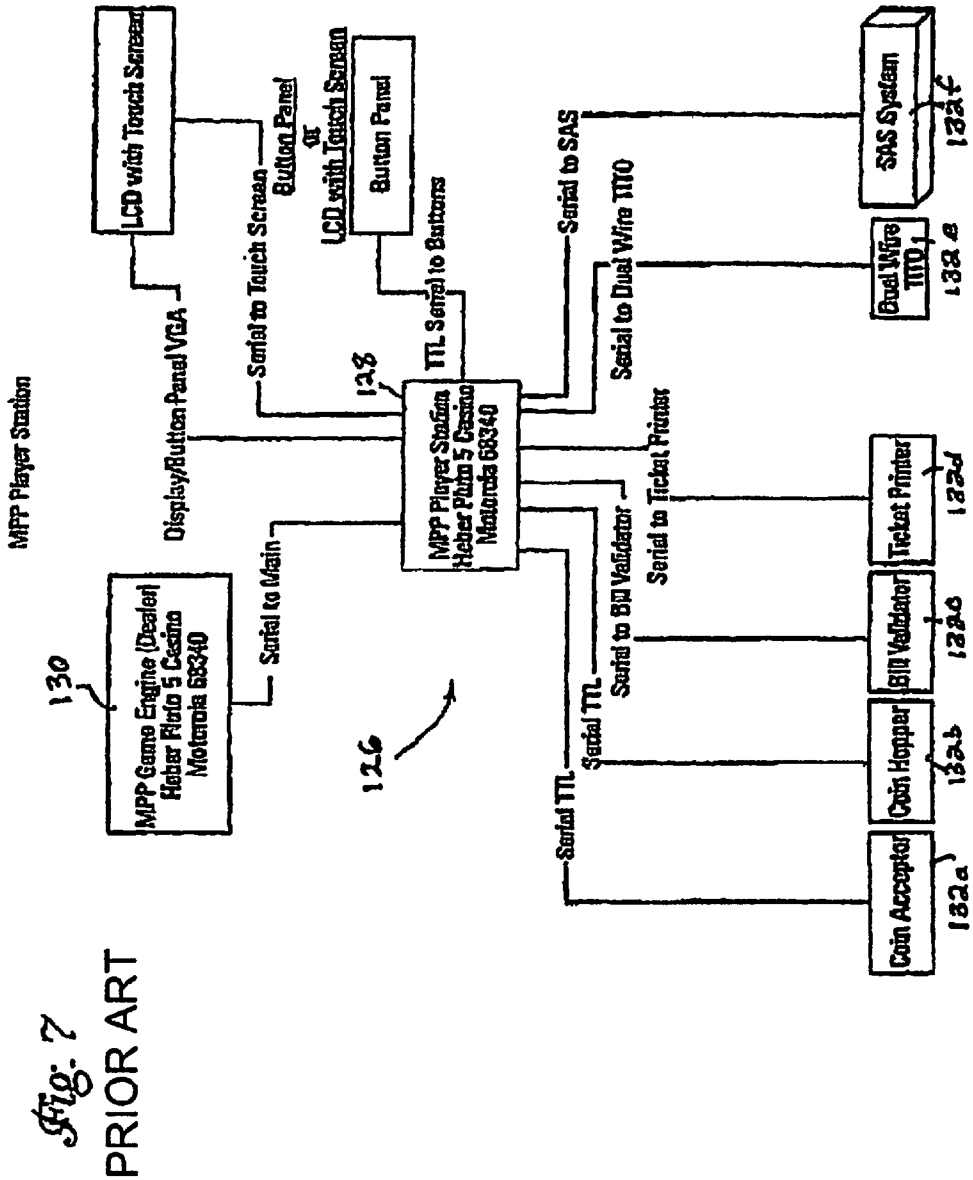
Fig. 7 PRIOR ART
FIG. 7 shows a schematic diagram of a player station useful in the practice of the present invention.

FIG. 7 shows the electronic/processing schematics 126 of the MPP Player Station Intelligence board 128 (Heber Pluto 5 Casino, Motorola 68340), each of which player stations (one for each player position) is in direct connection to the MPP Game Engine 130 (Dealer), which is in turn directly connected to the PC Platform (not shown in this Figure). Each Intelligence board receives information for all player input systems 132*a-f* specific to that player station, such as the shown Coin Acceptor, Coin Hopper, Bill validator, Ticket Printer, Touch Screen and/or Display Button Panel, Dual Wire Ticket-in-Ticket-Out Printing and SAS System (SAS is one exemplary standard communications protocol used by a number of casinos central computer systems.) A significant benefit resides in the use of the independent Intelligent boards 128 at each player position being in direct communication with the MPP Game Engine 130, as opposed to each individual player position button panel being dead or inactive until authorized by the main game processor, as previous automated gaming systems were constructed.

The above-described architecture is also an improvement in providing a system with not only the intelligence at each player position, but also in redistributing processing capability for functions among various processing components within the gaming system. In one architectural format, all functions of the gaming engine, except for the player localized intelligence functions, are consolidated into a single PC (e.g., the Pentium 4 shown in the Figures). This would include all game functions, player video functions, dealer video functions, dealer audio functions, security, central reporting (to a casino's central computer, for example), currency and debit functions, alarm functions, lighting functions, and all other peripherals on the system, except for the localized player functions. Alternatively, all functions requiring communication with the casino's main computer system are located on the player station intelligent boards. In this system, the main game processor would talk directly with the player intelligent boards, preferably in the same novel communication format described below.

An alternative system is shown in FIG. 8, where there is a dealer engine processor 132 intermediate the main game PC 134 and the Player intelligent boards (not shown). Both systems are a distinct improvement over the prior art, but with the higher power available for PC's, and with the ease of programming a PC as opposed to an embedded system, the consolidation of the game functions and the ability of the main game engine to communicate with each of the player positions is enabled. As shown in FIG. 8, the Game display processor 134 is preferably a Pentium® 4 PC and is separate from the main processor 132. With the player intelligent boards, the main game PC can receive packets of information from each player station as events occur rather than having to poll each player position on a regular basis 100 times to gain the specific information for each player input that may be made.

A description of the Heber Board, (an exemplary board that can be used as a player station processor and/or game engine processor 132) a commercially available intelligent processing board is as follows. The Heber Board is known for its reliability and flexibility, especially for the Pluto 5 family of gaming products. The Pluto 5 is the controller of choice for the global gaming industry. Flexibility comes from a set of features built into the Pluto 5 (Casino) controller, and from the choice of optional add-on boards that can be used to adapt the Pluto family to best suit individual applications. In the area of interfacing, there are three distinct boards, each of which serves a particular function in helping the Pluto 5 to connect with the world outside.

RS485 Board

RS485 is an industrial-grade board for linking multiple systems in unforgiving circumstances for centralized information gathering. The Heber RS485 board is fully optically-isolated to provide complete circuit safety when used within 'electrically noisy' environments.

The RS485 board uses a single RS232 connection to the Pluto 5 board and all necessary power is also derived through this link. Two header connectors may be provided for the RS485 channel to allow daisy chain connections between multiple systems.

HII/ccTalk Board

This board specializes in communicating with industry standard note/coin acceptors and payout hoppers. Equipped with dual communication channels, each port is configurable to use either the HII format to connect with Mars® coin/note acceptors or the ccTalk format for Money Controls® hoppers. Both channels are controlled via a single RS232 connection to the Pluto 5 board and all necessary power is also derived through this link. The Heber FastTrack™ package contains modular library functions for passing information via these channels.

Four Channel Relay Board

The relay board allows control of medium- to high-level loads such as solenoids, without risk of damage or interference to the Pluto 5 circuitry. Four power-switching channels are available with absolute isolation from the Pluto 5 control signals. Each relay is capable of switching direct or alternating currents of up to 7 A at a maximum voltage of 250V.

Like the Pluto 5 board itself, its modular options have been used extensively so that their designs are fully developed and entirely stable. The options that are specified are consistently provided in mass quantities. As with all Pluto products, programming for the modular options is straightforward. This is enhanced with the use of the Pluto 5 Enhanced Development Kit and also the FastTrack™ package. Between them, these kits contain all of the low level and high level programming tools and library functions needed for gaming applications. These systems can be provided through a Pluto 5 Enhanced Development Kit datasheet 80-15353-7 (Heber Limited, Belvedere Mill, Chalford, Stroud, Gloucestershire, GL6 8NT, UK Tel: +44 (0) 1453 886000 Fax: +44 (0) 1453 885013; www.heber.co.uk). Specifications for the various boards are identified below.

RS485 Interface

Host Interface

RS232 connection to Pluto 5/Pluto 5 Casino All power provided via RS232 link from host system Communication Port Dual four-way Molex 0.1" KK headers for daisy chaining purposes Dimensions 80.times.61 mm (3.14×2.4") Part Number Opto-isolated RS485 board 01-14536-2 HII/ccTalk Interface Host Interface RS232 connection to Pluto 5/Pluto 5 Casino All power provided via RS232 link from host system Communication Port Single or dual 10 way header connectors Dimensions 101.6.times.69.85 mm (4.times.2.8") Part Number Dual channel HII/ccTalk board 01-16171-2 Four Channel Relay Board Host Interface Connection to Pluto 5/Pluto 5 Casino via ribbon cable using four standard output lines All power provided via ribbon cable link from host system Switching Capabilities Up to 250V AC or DC@7 A maximum per channel Dimensions 80.times.61 mm (3.14.times.2.4") Part Number Four channel relay board 01-15275-1 80-16949-1

One proposed hardware configuration uses a "satellite" intelligent processor at each player position. The player station satellite processor is substantially the same as the primary game engine processor, a Heber Pluto 5 Casino board. The satellite processors receive instruction from the primary game engine but then handle the communications with player station peripherals independently. Each satellite processor communicates with only the peripherals at the same player station. Thus each player station has a dedicated satellite processor communicating with only the peripherals at the same player station and with the casino's central computer system. The peripherals are, but not limited to: Slot accounting Systems, Bill Validator, Ticket Printer, Coin Acceptor, Coin Hopper, Meters, Button panel or LCD touch screen and various doors and keys.

The satellite processors run proprietary software to enable functionality. The player station software is comprised of two modules, the first being an OS similar to the game engine Operating System and the second being station software that handles peripheral communications. The software may be installed on EPROMs for each satellite processor. The primary method of communication between the satellite processors and the primary game engine is via serial connectivity and the previously described protocol. In one example, information packets are prepared by the satellite processors and are sent to the game engine processor on the happening of an event.

The proposed game engine provides communication to the player stations to set the game state, activate buttons and receive button and meter information for each player station. Communication is via a serial connection to each of the stations. The new protocol for communication between the game engine, game display and player stations is an event driven packet-for-packet bi-directional protocol with Cyclic Redundancy Check (CRC) verification. This is distinguished from the Sega system that used continuous polling. This communication method frees up resources in the same engine processor because the processor no longer needs to poll the satellites continuously or periodically.

As seen from these configurations, the electronic version may be effected on any electronic system, either self-contained, hard-wired, internet, WAN, LAN, from hand-held devices (e.g., smart phones, pads, notebooks, etc.) and the like.

The new protocol uses embedded acknowledgement and sequence checking. The packet-for-packet protocol uses a Command Packet, Response Packet and a Synchronization Packet as illustrated below. The protocol uses standard ASCII characters to send data and a proprietary verification method.

As shown in FIG. 8, FIG. 8A shows four cars with a preventing "wreck" symbol. Upon exercise of the EAE, the full potential value of an award is achieved by replacement (randomly) with a car symbol in FIG. 8B.

In FIGS. 8C and 8D, an improvement was made by removing the disqualification symbol (or words) and an award collection (four gold medals and one bronze medal) was achieved. FIG. 8E cannot be improved by a single EAE event as there are two disqualifying symbols.

One can purchase a fixed number of insurance spins or insured spins rather than having to purchase individual spins for each game. For example, if the player has purchased 100 credits/units, he/she may use some of those credits or add additional value to the system to purchase (by way of non-limiting examples) 10 insurance spins, which would be automatically applied to the next ten games. It is also possible to have prepurchased insured spins discounted, such that in prepurchasing (and paying for) twenty insurance spins, twenty-five insured spins may be awarded.

It must be appreciated that even though insurance activity has been purchased, there is no guarantee in the purchase that an eventual payout will occur or that there will be any payout on all game conclusions. For example, where there was a limiting symbol in the first spin, the spin after the insurance might not improve the results. It is possible, that after an insurance spin, a limiting symbol may be replaced by another limiting symbol or even a preventing symbol and the initial award available is terminated.

The game may include an automatic reorganization function. In the Reorganization function, where the desirable symbols in a payline are not in a pay order (e.g., are in columns 1, 2, 4 and 5; or columns 2, 3, 4 and 5), upon execution of the insurance function, the limiting orm adverse symbol would be removed, and the desirable symbols slid into an appropriate payout order, for example in the above two cases, into columns 1, 2, 3 and 4, and then only column 5 would be respun.

It is also possible to have a game or a button implementing a game where an insurance charge is applied automatically in addition to the amount of the wager selected by the player. The automatic charge for the insurance would be a fixed amount per game, without regard to the number of units wagered.

If there is a bonus round available from the underlying game, the insurance benefit may or may not be carried over into the bonus event. For example, if the bonus is ten free spins at the wager amount of the winning underlying game spin event, if there was an insurance effect purchased for the winning spin, the ten free spins may or may not (according to game design and software) also each have an insurance effect available after each of the free ten spins. It may also be possible to allow fewer than all of the free spins to have the insurance (EAE) effect available. Only the first spin, alternative spins, the first two spins, the first five spins, etc. may be provided with the EAE. It may also be possible that the EAE may be available on the free spins only until there is one winning event, or one winning event larger than a push in the exercise of free spins.

The present technology, as enabled above, may be used in single, stand alone gaming systems, hand-held individual devices, networked gaming devices, community gaming devices, internet gaming systems, distally entered gaming systems, and the like may all be used to practice this technology.

What is claimed:

1. A method of playing a wagering game in which winning outcomes are determined by random appearance of specific predetermined symbols the method being conducted on a gaming machine comprising at least one display, a player input device, a processor including a random number generator, at least one wager accepting device configured to accept a monetary wager from a player, and a memory storing machine readable code executable by the processor, the method comprising:

receiving a wager from a player at the wager accepting device representing monetary value on a single gaming event in the wagering game;

receiving a request via the player input device from the player to purchase for monetary value a safeguard action useful only in the single gaming event;

providing a first complete set of random symbols and displaying the set of random symbols on the at least one display;

when one symbol in the first complete set of random symbols operates to prevent or limit an amount of an award in the single gaming event, exercising the safeguard action;

discarding and replacing the one symbol with one randomly provided symbol to form a second complete set of random symbols and displaying the second complete set of random symbols on the at least one display; and resolving the wager against a paytable using the second complete set of random symbols.

2. The method of claim 1 wherein the symbols are provided as virtual playing cards selected via the random number generator associated with the gaming machine processor and displayed on the at least one display.

3. The method of claim 1 wherein the symbols are randomly displayed on the at least one display in frames distributed in columns and rows, and winning outcomes are determined against the paytable according to paylines in the columns and rows.

4. The method of claim 3 wherein the gaming apparatus provides the symbols on mechanical reels.

5. The method of claim 1 wherein the symbols relate to a theme other than playing cards.

6. The method of claim 5 wherein the one symbol is an image that has a negative connotation within the theme.

7. The method of claim 1 wherein the safeguard action is purchased before the first complete set of symbols is provided, and the safeguard action is not usable after conclusion of the single gaming event.

8. The method of claim 1 wherein the safeguard action is purchased before the first complete set of symbols is provided, and the safeguard action is not usable after conclusion of the single gaming event.

9. The method of claim 5 wherein the safeguard action is purchased before the first complete set of symbols is provided, and the safeguard action is not usable after conclusion of the single gaming event.

10. The method of claim 6 wherein the safeguard action is purchased before the first complete set of random symbols is provided, and the safeguard action is not usable after conclusion of the single gaming event.

11. A gaming apparatus for presenting a wagering game, the apparatus comprising:

a processor including a random number generator, player input controls, at least one memory, at least one wager accepting device configured to accept a monetary wager from a player, and a display screen, the memory comprising machine readable instructions which when executed by the processor, cause the gaming machine to:

receive a wager from a player at the wager accepting device worth monetary value on a single gaming event in the wagering game;

receive a request from the player via the player input controls to purchase with monetary value a safeguard action useful only in the single gaming event;

display on the display screen to the player a first complete set of random virtual symbols;

when one virtual symbol in the first complete set of symbols prevents or limits an amount of an award in the single gaming event, receive input instructions from the player via the player input controls to exercise the safeguard action;

discard and replace the one virtual symbol with one randomly provided virtual symbol to form a second complete set of virtual symbols; and resolve the wager against a paytable using the second complete set of virtual symbols.

12. The apparatus of claim 11 wherein the virtual symbols relate to a theme other than playing cards.

13. The apparatus of claim 12 wherein the one virtual symbol is an image that has a negative connotation within the theme.

14. The apparatus of claim 11 wherein the safeguard action is purchased before the first complete set of virtual symbols provided, and the safeguard action is not usable after conclusion of the single gaming event.

15. The apparatus of claim 12 wherein the safeguard action is purchased before the first complete set of symbols is provided, and the safeguard action is not usable after conclusion of the single gaming event.

16. The method of claim 2 wherein when a bonus event is awarded on a single game event where the safeguard action is in effect, the safeguard action is also in effect during play of the bonus event.

17. A method of playing a wagering game in which winning outcomes are determined by random appearance of specific predetermined symbols the method being conducted with at least one set of physical game pieces, the game pieces each comprising a game symbol, the method comprising:

receiving a wager from a player representing monetary value on a single gaming event in the wagering game;

receiving a request from the player to purchase for monetary value a safeguard action useful only in the single gaming event;

providing a first complete set of random physical game pieces from the at least one set of physical game pieces, the first complete set of random physical game pieces defining a first symbol set;

when one symbol in the first symbol set operates to prevent or limit an amount of an award in the single gaming event, receiving from the player a request to exercise the safeguard action;

discarding and replacing the one symbol with one randomly provided physical game piece comprising another random symbol to form a second symbol set; and resolving the wager against a paytable using the second symbol set.

18. The method of claim 17, wherein the at least one set of physical game pieces is at least one deck of physical playing cards.

19. The method of claim 1, wherein the safeguard action is exercised based on instructions received from the player via the player input device.

* * * * *